United States Patent [19]
Tholema et al.

[11] Patent Number: 5,888,400
[45] Date of Patent: Mar. 30, 1999

[54] PROCESS FOR PREPARING LOW-SALT PREPARATIONS OF CONDENSATION PRODUCTS

[75] Inventors: Edzard Tholema, Odenthal; Wolfgang Zarges, Köln; Harro Träubel, Leverkusen, all of Germany

[73] Assignee: Bayer Aktiengesellschaft, Leverkusen, Germany

[21] Appl. No.: 879,452

[22] Filed: Jun. 20, 1997

[30] Foreign Application Priority Data

Jun. 26, 1996 [DE] Germany ............. 196 25 540.6

[51] Int. Cl.⁶ ............................................. B01D 11/04
[52] U.S. Cl. ..................... 210/644; 210/651; 528/482; 568/34; 568/810
[58] Field of Search ................ 568/27, 28, 34, 568/810; 528/482; 524/909; 210/639, 644, 651, 652, 654, 681; 9/94.24

[56] References Cited

U.S. PATENT DOCUMENTS

| | | |
|---|---|---|
| 4,325,890 | 4/1982 | Reitz et al. . |
| 4,444,945 | 4/1984 | Sheldrick ............................. 524/843 |
| 4,465,492 | 8/1984 | Putzar .................................. 8/589 |
| 4,537,893 | 8/1985 | Titus et al. . |
| 4,560,480 | 12/1985 | Lacroix et al. . |
| 4,585,459 | 4/1986 | Opitz et al. . |
| 4,702,744 | 10/1987 | Wolff et al. ............................ 8/527 |
| 4,838,895 | 6/1989 | Galli et al. ............................ 8/527 |
| 5,310,855 | 5/1994 | Walz et al. .......................... 528/137 |
| 5,565,102 | 10/1996 | Brandt et al. . |
| 5,679,766 | 10/1997 | Zampini ............................. 528/482 |

FOREIGN PATENT DOCUMENTS

| | | |
|---|---|---|
| 0 037 250 | 10/1981 | European Pat. Off. . |
| 0037250 A2 | 10/1981 | European Pat. Off. ......... C14C 3/20 |
| 0210378 | 2/1987 | European Pat. Off. ........ C09B 67/26 |
| 0288434 | 10/1988 | European Pat. Off. ........ C09B 67/26 |
| 0474075 | 3/1992 | European Pat. Off. ......... C08G 8/28 |
| 848 823 | 7/1949 | Germany . |
| 11 13 457 | 5/1959 | Germany . |
| 31 48 878 A1 | 6/1983 | Germany . |
| 1 220 018 | 1/1971 | United Kingdom . |
| 9426797 | 11/1994 | WIPO ........................... C08G 12/40 |

OTHER PUBLICATIONS

AbfallwirtschaftsJournal No. 4, Apr. 1990 pp. 197–221.
Ullmaann's Encyclopedia of Industrial Chemistry, vol. A 16, pp. 187–263.
Chem. Ing. Techn. 67 (1995) Nr. 4, pp. 401–418.
Chem. Ing. Techn. 66 (1994) Nr. 12, pp. 1610–1619.
Hanbook of Industrial Membrane Technology, Mark C. Porter (1988) pp. 482–511.
B. Toth J. Vaida, Das Leder 22 (1971), p. 12.
Ullmann's Enclopedia of Industrial Chemistry, vol. 16 (4th Ed.) Weinheim (1979), p. 138.

*Primary Examiner*—Melvyn I. Marquis
*Assistant Examiner*—D. Aylward
*Attorney, Agent, or Firm*—Sprung Kramer Schaefer & Briscoe

[57] ABSTRACT

A process for preparing low-salt preparations of condensation products based on

A) sulphonated aromatics,
B) aldehydes and/or ketones and optionally
C) one or more compounds selected from the group consisting of nonsulphonated aromatics, urea and urea derivatives, characterized in that inorganic acid present after the condensation is separated off in whole or in part from the condensation product, optionally in the form of its salts after neutralization, until the inorganic salt content is less than 10% by weight, relative to the preparation, leads to preparations which are outstandingly suitable as tanning agents, dispersants and liquefiers.

19 Claims, No Drawings

PROCESS FOR PREPARING LOW-SALT PREPARATIONS OF CONDENSATION PRODUCTS

The invention relates to a process for preparing low-salt preparations of condensation products of sulphonated aromatics and aldehydes and/or ketones and optionally further compounds such as nonsulphonated aromatics, urea and/or urea derivatives, to specific low-salt preparations of such condensation products and to their use as tanning agents, liquefiers and dispersants.

Condensation products of sulphonated aromatics and formaldehyde are already known. They are used in the form of their salt-containing solutions, or drying products thereof, as tanning agents or as dispersants (EP-A 37 250, DE-A29 34 980). The known salt-containing preparations of such condensation products, however, still have some disadvantages capable of improvement. For example, the liquid preparations in particular have as yet inadequate storage stabilities.

A process has now been found for preparing low-salt preparations of condensation products based on A) sulphonated aromatics,
B) aldehydes and/or ketones and optionally
C) one or more compounds selected from the group consisting of nonsulphonated aromatics, urea and urea derivatives, characterized in that inorganic acid present after the condensation is separated off in whole or in part from the condensation product, optionally in the form of its salts after neutralization, until the inorganic salt content is less than 10% by weight, relative to the preparation.

"Based on" means that the condensation product has optionally been prepared from further reactants in addition to A, B and, if used, C. Preferably, however, the condensation products within the scope of this application are prepared only from A, B and, if used, C.

Within the scope of this application, the term sulphonated aromatics is used to refer to sulphomethylated aromatics as well. Preferred sulphonated aromatics are naphthalenesulphonic acids, phenolsulphonic acid, sulphonated ditolyl ethers, 4,4'-dihydroxydiphenyl sulphone, sulphonated diphenylmethane, sulphonated biphenyl, sulphonated terphenyl or benzenesulphonic acids.

Particularly suitable aldehydes and/or ketones are aliphatic, cycloaliphatic and aromatic examples. Preference is given to aliphatic aldehydes, with particular preference being given to formaldehyde and also other aliphatic aldehydes having 3 to 5 carbon atoms.

Examples of suitable nonsulphonated aromatics are phenol, cresol and dihydroxydiphenylmethane.

Examples of urea derivatives are dimethylolurea, melamine or guanidine.

Phenol and phenol derivatives such as, for example, phenolsulphonic acid are in many cases also linked by the simultaneous action of formaldehyde and urea or by means of dimethylolurea (DE-A 11 13 457). Sulphonation products of aromatic compounds are (according to Ullmann's Encyklopädie der technischen Chemie, volume 16 (4th edition) Weinheim 1979, p. 138) generally, without separating off the unreacted starting compounds, condensed—alone or together with other starting compounds—with formaldehyde. In the case of phenols, a solubilizing group may also be introduced by sulphomethylation with simultaneous action of alkali metal hydrogen sulphite and formaldehyde together with the condensation. This sulphomethylation is described, for example,. in DE-A 848 823. The reaction of unreacted starting products, for example unsulphonated aromatics, with formaldehyde to give the finished tanning agents can also lead to unwanted byproducts; by virtue of the novel process, it is possible to remove such starting compounds and to add them to a new sulphonation.

In addition, the deliberate, joint condensation of ligninsulphonates with aromatic hydroxy compounds (B. Toth, J. Vaida, Das Leder 22 (1971), p. 12 ff.) can be improved by virtue of the novel process in respect of salt content and the exclusion of fractions of low molecular mass.

Further preferred condensation products are condensates of ditolyl ether sulphonic acid with 4,4'-dihydroxydiphenyl sulphone, phenolsulphonic acid with phenol, formaldehyde and urea.

Particularly preferred condensation products are those which are obtained by condensation of sulphonated and optionally nonsulphonated aromatics with aliphatic aldehydes, preferably formaldehyde, the term sulphonated aromatics specifically excluding sulphomethylated aromatics.

Such condensation products are preferably obtained by condensation of sulphonated naphthalene and sulphonated phenol (or 4,4'-dihydroxydiphenyl sulphone) with formaldehyde or from naphthalenesulphonic acid and formaldehyde.

The condensation product obtained preferentially in the condensation preferably has a mean degree of condensation of from 1 to 150, preferably from 1 to 20, in particular from 1 to 5.

The novel process is particularly preferred if the condensation products have been prepared from A) sulphonated aromatics,
B) formaldehyde and optionally
C) nonsulphonated aromatics.

The condensation generally proceeds at pH values of from −1 to 9. In a particularly preferred embodiment, the condensation of sulphonated and optionally nonsulphonated aromatics—which do not carry any hydroxyl groups—takes place with aldehydes and/or ketones, especially an aldehyde, preferably formaldehyde and optionally urea and/or urea derivatives, in the acidic pH range. The condensation of sulphonated aromatics which carry hydroxyl groups with an aldehyde, especially with formaldehyde, takes place preferably at pH 6–8. The condensation products are preferably in the form of alkali metal salts, alkaline earth metal salts or ammonium salts or of mixtures thereof. Particularly preferred salt forms are the Na, K, Li, $NH_4$, Ca, Mg or $NR_1R_2R_3R_4$ salts, where $R_1$ to $R_4$ denote identical or different $C_1$–$C_8$-alkyl or $C_6$–$C_{10}$-aryl radicals or H.

The inorganic acid used for separation is preferably HCl or $H_2SO_4$. As salts thereof there are understood, within the context of this application, preferably inorganic salts, for example alkali metal chlorides and sulphates, alkaline earth metal chlorides and sulphates and ammonium chlorides and sulphates, the term ammonium salts referring to $NR_1R_2R_3R_4$ salts, where $R_1$ to $R_4$ are identical or different and denote H, $C_1$–$C_8$-alkyl or $C_6$–$C_{10}$-aryl radicals. $Na_2SO_4$ and also $(NH_4)_2SO_4$ or NaCl are referred to in particular.

Prior to, or following, completed condensation, the acid optionally originating from the prior sulphonation of the aromatic and/or the acid used in the condensation reaction are/is preferably neutralized in whole or in part. After completed condensation, a pH of from 3 to 8 is preferably established. The pH is preferably established in such a way that a 1% strength solution has the indicated pH. This is done by using, in particular, an inorganic base such as, for example, NaOH, $Na_2CO_3$, KOH, LiOH, $NH_4OH$.

This sulphonation of the aromatics for preparing the abovementioned sulphonated aromatics generally takes place in accordance with known processes as are described, for example, in DE-A 29 34 980. Examples of suitable sulphonating agents which can be used are chlorosulphonic acid, amidosulphonic acid, oleum and also sulphuric acid.

The resulting reaction mixture is preferably employed for the subsequent condensation without isolating the sulphonated aromatics. The reaction mixture is preferably employed without separating off the nonsulphonated aromatics.

The techniques which are employed in accordance with the novel process in order to separate off the inorganic acid in the form of its salts—in short desalting techniques—are, for example, those based on the freeze separation of salts, as are known, for example, from EP-A 15 82 33. In a preferred embodiment of the novel process, desalting is carried out by means of membrane separation techniques. Preferred membrane separation techniques which come into consideration in this context are ultrafiltration, diffusion dialysis or electrodialysis.

Ultrafiltration, which is generally operated as cross-flow ultrafiltration, and the membranes used therein are known per se (see, for example, Ullmann's Encyclopedia of Industrial Chemistry, vol. A16, 1990, pp. 187–263). The membranes employed are generally commercially available membranes which are prepared, for example from organic materials such as polysulphones or PVDF (polyvinylidene fluoride) or from inorganic materials such as $TiO_2$, $ZrO_2$ or $Al_2O_3$, in the form of capillary membranes, tubular membranes or flat membranes. Flat membranes are employed, for example, in membrane cushions or in spiral wound modular form, as are known from Abfallwirtschaftsjournal 2 (1990) 197–221. In the case of desalting by ultrafiltration in the novel process, transmembrane pressure differences of from 1 to 200 bar, preferably from 1 to 100 bar, are generally applied. In a particularly preferred embodiment, the transmembrane pressure difference is from 30 to 100 bar.

The membranes used in the case of desalting by diffusion dialysis are known, for example, from Ullmann's Encyclopedia of Industrial Chemistry, vol. A15, 1990 and EP 126 830. The same applies to the parameters to be observed in the case of this technique.

The electrodialysis membranes and electrodialysis apparatus to be employed in the case of desalting by electrodialysis are known, for example, from Handbook of Industrial Membrane Technology, 1995, pp. 482–510 and from EP-A 167 107 and Abwassertechnik in der Produktion, vol. 2, section 7.

In a preferred embodiment, the membranes employed in the membrane separation technique, preferably in ultrafiltration, have a molecular weight cutoff (MWCO) of from 1,000 to 10,000 daltons.

The aqueous solutions, or suspensions of such condensation products which are employed for desalting, preferably have a solids content of 40–70% by weight and a salt content of more than 5% by weight, preferably more than 10% by weight, based in each case on the preparation. The content of condensation product, based on the solids content, is preferably from 70 to 90% by weight, in particular about 80% by weight.

The salt content to be established with the particular desalting technique used, preferably by means of membrane separation techniques, is preferably <10% by weight, in particular <5% by weight, in particular <2% by weight, and, with very particular preference, <1% by weight, based on the preparation.

The aqueous preparation of condensation products which is to be desalted can be prepared in a variety of ways. For example, corresponding salt-containing preparations can be prepared by mixing separately prepared condensation products or are obtained by means of the above-described condensation process.

Preferably, the preparation of suspensions or solutions which contain salts of the inorganic acids and are to be desalted takes place by condensation of sulphonated aromatics with aldehydes and/or ketones and optionally further compounds such as nonsulphonated aromatics, urea and/or urea derivatives.

If the inorganic acid originating from the preparation of the sulphonated aromatic A) and/or from the condensation of A) and B) and, if used, C) is separated off as it is from the condensation product, then the sulphonated aromatics are preferably prepared using sulphuric acid, chlorosulphonic acid, amidosulphonic acid and/or oleum as sulphonating agent, after which there follows—without isolation and together, if desired, with nonsulphonated aromatics, urea and/or urea derivatives—the condensation with the aldehydes and/or ketones, especially aliphatic aldehydes, in which case any sulphonating agent used in excess and/or the inorganic nonaqueous reaction product which may be formed during the sulphonation, i.e. inorganic acids, especially HCl or $H_2SO_4$, are/is removed in whole or in part from the condensation reaction mixture by means of a membrane separation technique.

In the case of this novel process variant, the sulphonated aromatics, nonsulphonated aromatics, aldehydes and condensation products already described above are preferably prepared and/or employed and/or obtained. The excess sulphonating agent and/or the inorganic nonaqueous reaction product which may be formed during the sulphonation preferably comprise/comprises the inorganic acid $H_2SO_4$ and/or HCl.

The separation of the inorganic acid with the aid of a membrane separation technique is preferably effected by difiltration with acid-stable ultra- or nanofiltration membranes in a cross-flow filtration. Examples of membranes which are suitable in this context are polyhydantoin membranes, as are known from EP-A 65 20 44.

Preferred membranes for this purpose have a MWCO level of from 2,000 to 10,000 daltons. If desired, concentration is carried out simultaneously in the course of this technnique step.

Any synthesis salts which may be present are likewise separated off in this technique. In this context, some or all of the inorganic acid can be separated off. Where only some is separated off, the remaining acid is preferably neutralized in whole or in part. In this case a pH of from 3 to 8 is preferably established. The pH is preferably established such that a 1% strength solution has the indicated pH. Neutralization is carried out in particular using an inorganic base, for example NaOH, $Na_2CO_3$, KOH, LiOH, $NH_4OH$.

The salt content of the preparations prepared by this novel process is preferably <10%, in particular <5% and, with very particular preference, less than 1% by weight, based on the preparations.

The liquid low-salt preparations prepared by the two above-described technique variants for separating off the inorganic acid as it is and for separating off the inorganic acid in the form of its salt, respectively, are referred to below, in order to avoid confusion, as suspensions or solutions which have been "desalted" or, respectively, "freed from salt formers". Salt formers in the technique described last are, for example HCl or $H_2SO_4$, the term "freed" denoting complete or partial freeing.

The "desalted" solutions or suspensions, i.e. the solutions or suspensions obtained by the above-described desalting technique, and the preparations which have been "freed from salt formers", i.e. the solutions or suspensions which have been freed by membrane techniques from sulphonating agents and/or inorganic sulphonation products following the condensation reaction by the likewise above-described technique, can subsequently, for example, be concentrated, subjected to special membrane treatment and/or, if desired, dried.

The concentration of these preparations can be carried out, for example, by means of ultrafiltration, nanofiltration or reverse osmosis.

In these cases, the membranes customary for these techniques are used and the customary conditions observed. When using ultrafiltration for desalting, desalting can be effected by difiltration. Where concentration is desired, desalting can be carried out with simultaneous concentration.

In a preferred embodiment, those aqueous solutions or suspensions of the above condensation products which are to be desalted, prior to their novel desalting, or the suspensions or solutions which have been "freed from salt formers" or desalted by the novel processes are, if desired, following their respective concentration, permeated through a membrane having a MWCO of >80,000 daltons, preferably from 200,000 to 500,000 daltons.

In a further preferred embodiment, those suspensions or solutions of the above condensation products which have been "freed from salt formers" or "desalted" by the novel processes and may have been concentrated and may have been permeated through membranes having a MWCO level of >80,000 daltons are dried. Prior to drying, it is, of course, possible to add to the aqueous preparation additives which are customary for tanning agents, liquefiers or dispersants, the addition of these additives leaving the salt content below 10% by weight, preferably below 5% by weight, in particular <1% by weight, based on the preparation.

Examples of suitable drying techniques are the techniques described in Chem. Ing. Tech. 66 (1994) 1 610 and in Chem. Ing. Tech. 67 (1995) 401. Spray drying is particularly preferred. The solid preparation formed in the course of drying is in the form, for example, of a powder or granules. It has a salt content of <10% by weight, preferably <5% by weight, in particular <1% by weight, based on the preparation. The content of condensation product in the solid preparation is preferably from 85 to 98% by weight, based on the preparation.

The preparations obtained by the novel processes which have been "desalted" or "freed from salt formers" are highly storage-stable in the form of their aqueous suspension or solution, preferably in the form of their concentrated solution. The corresponding solid preparations feature not only good storage stability but also possibly a low dust content, resistance to abrasion and good granule stability.

It has been found that the aqueous and the solid preparations obtained by the novel processes are outstandingly suitable as tanning agents, dispersants or liquefiers (see, for example, DE-A 2 934 980), the term tanning agents referring also to auxiliary tanning agents and retanning agents. The invention therefore also relates to the corresponding use of these preparations. For the uses indicated, these aqueous and solid preparations have enhanced effectiveness relative to the preparations not prepared by the novel processes. The performance properties of these low-salt preparations are likewise improved. Examples of such properties which may be mentioned are the enhanced fullness of the leather tanned using them and the enhanced hand in the case of the retanning of leather.

Examples of preparations which are particularly suitable for the abovementioned uses are those comprising a condensation product based on A) sulphonated aromatics,
B) aldehydes and/or ketones and optionally
C) one or more compounds selected from the group consisting of nonsulphonated aromatics, urea and urea derivatives, the condensation product having a mean degree of condensation of less than or equal to 5, preferably from 1 to 5, and the inorganic salt content of the preparation being <10% by weight, based on the preparation. Particular preference is given to the condensation product of sulphonated aromatics and an aliphatic aldehyde, especially formaldehyde, and optionally nonsulphonated aromatics. These preparations are preferably in aqueous form with a preferred salt content of <5% by weight, in particular <1% by weight, based on the preparation. In a preferred embodiment, these preparations contain the condensation products in an amount of from 10 to 60% by weight, in particular in an amount of from 30 to 60% by weight, based on the preparation. Furthermore, these aqueous preparations may comprise additional additives, for example from 0 to 10% by weight of aromatic and/or aliphatic mono- and/or polycarboxylic acid, for example glutaric acid,
from 0 to 3% by weight of complexing agents for iron, such as EDTA.

Likewise preferred are these novel preparations in their solid form. Their salt content is preferably <10% by weight, in particular <5% by weight, and, with very particular preference, <1% by weight, based on the preparation. Their content of said condensation product is preferably from 90 to 98%. The solid preparations may also include the abovementioned additional additives. The amounts thereof generally result from the preferred amounts of additional additives for the liquid preparations after drying.

The invention additionally relates to these preparations, per se, used in accordance with the invention. These preparations can be prepared, for example, by one of the novel processes. With particular preference these preparations, comprising the above condensation product having a mean degree of condensation of less than or equal to 5, in particular from 1 to 5, are employed as tanning agents, and as dispersants.

The solutions or suspensions desalted in accordance with the novel process by the above-described membrane separation techniques, and the solutions or suspensions obtained by the novel process which have been "freed from salt formers", some or all of the salt formers being removed by membrane techniques after the condensation, preferably have a residual monomer content ranging from low to zero. A low residual monomer content refers to a residual monomer content of less than 30% by weight, preferably less than 20% by weight, based on the condensation product, in particular <10% by weight, preferably <5% by weight. The term residual monomers refers in this context to the reactants employed to prepare the condensation product. The monomers separated off in the novel processes can be reused in a corresponding condensation reaction. For this purpose, it is preferred to use the eluate originating from the novel process in which the salt formers are removed by membrane techniques, since the salt load is lower.

Likewise preferably suitable for the abovementioned uses are preparations comprising a condensation product based on A) sulphonated aromatics, B) aldehydes and/or ketones and optionally C) one or more compounds selected from the group consisting of nonsulphonated aromatics, urea and urea derivatives, the residual monomer content being less than 30% by weight, preferably less than 20% by weight, based on the condensation product, in particular <10% by weight and the inorganic salt content being <10% by weight, preferably <5% by weight, in particular <1% by weight, based on the preparation.

The preferred residual monomer content is less than 30% by weight, preferably less than 20% by weight, particularly preferably less than 10% by weight, in particular less than 5% by weight, based on the condensation product. The preferred inorganic salt content is <5% by weight, in particular <1% by weight, based on the preparation.

The invention additionally relates to these low-salt and low-residual-monomer preparations used in accordance with the invention, it being possible to prepare these preparations likewise by the novel process.

With particular preference these preparations are in aqueous form, with a preferred salt content of <5% by weight, in particular <1% by weight, based on the preparations. In a further preferred embodiment, these preparations comprise the condensation products in an amount of 10–60% by weight, in particular in an amount of 30–60% by weight, based on the preparation.

Particular preference is likewise given to these low-salt and low-residual-monomer preparations in which the condensation product has a mean degree of condensation of 1–20, preferably 1–10, in particular 1 to 5. The preferred condensation products have already been specified above.

In a further preferred embodiment, the novel preparations comprising a condensation product are obtainable by permeating an aqueous solution or suspension of a condensation product based on A) sulphonated aromatics, B) aldehydes and/or ketones and optionally C) one or more compounds selected from the group consisting of nonsulphonated aromatics, urea and urea derivatives through an ultrafiltration membrane which has a MWCO level of >80,000 daltons, in particular from 200,000 to 500,000 daltons.

In this case, desalting can be carried out before or after this membrane treatment, but is not mandatory. Preparations obtainable in such a way have the advantage of having particularly good actions even when they are just used in small amounts. In addition, they have technical advantages connected with their application.

These novel preparations can be used in aqueous preparation form, with or without the addition of further additives, as have been described, for example, above, or in solid preparation form by drying, with or without the addition of further additives.

The preferred salt content, solids content and condensation product content of the above-described novel preparations correspond to those which have been specified for the novel process. Moreover, particularly preferred novel preparations are those whose condensation products have the abovementioned molecular weights and degrees of condensation. The novel preparations can be prepared, for example, by the novel process.

Particularly preferred tanning agents are the novel preparations, or the preparations prepared by the novel processes, of condensation products having a mean degree of condensation of less than or equal to 5, in particular from 1 to 5.

As dispersants it is particularly preferred to use the novel preparations, or the preparations prepared for the novel processes, of condensation products having a mean degree of condensation of from 3 to 10. Particular preference is given to the use, as dispersants, of those which, as condensation products, have been obtained from hydroxyl-free sulphonated aromatics and aldehydes, especially formaldehyde.

As liquefiers it is particularly preferred to use the novel preparations, or the preparations prepared by the novel process, of condensation products having a mean degree of condensation of from 1 to 5.

The use of the novel preparations, or of the preparations obtained in accordance with the invention, as dispersants is preferably characterized in that the novel preparation, or the preparation obtained in accordance with the invention, is added to an aqueous suspension of a solid, in particular a pigment, preferably an organic pigment, and/or dye, and the suspension is optionally homogenized, for example in a wet comminution apparatus such as a bead mill.

In this case, storage-stable dispersions which are optionally spray-dried are obtained.

The use of the novel preparations, or of the preparations obtained in accordance with the invention, as liquefiers, especially as liquefiers for concrete, is preferably characterized in ,that the novel preparation, or the preparation obtained in accordance with the invention, is added, preferably in an amount of from 0.1 to 1.0% by weight, based on the suspension to be liquefied, to a suspension which is to be liquefied.

The use of the novel preparations, or of the preparations obtained in accordance with the invention, as tanning agents is preferably characterized in that a tanned leather, for example chrome-tanned leather (wet blue), is neutralized, retanned, dyed and/or greased in the presence of the novel preparation or of the preparation obtained in accordance with the invention. Commonly, these process steps are all summarized under the term "retanning".

EXAMPLE 1

25 kg of a solution prepared by mixing a solution prepared from 23 parts (mass) of naphthalene and 18 parts of phenol by sulphonation followed by condensation with formaldehyde and a solution prepared from naphthalene by sulphonation followed by condensation with formaldehyde are adjusted to a pH of from 3 to 7 using sodium hydroxide solution and then subjected to cross-flow filtration at a transmembrane pressure of 35 bar and at a temperature of 30° C. This is done using a tubular membrane with a MWCO of 9,000 g/mol. Four fold difiltration (continuous exchange of permeate for deionized water) reduces the sulphate content from 6.0% to <0.2%. At the same time, the residual monomer content, based on the overall amount of condensation product, falls from 22% to 9% by weight. The mean degree of condensation was less than or equal to 5. At the concluding concentration, the content of active substance is raised by 45%. At the same time, the sulphate content experiences no further change. When used as a tanning agent in individual tanning and retanning, the preparation gives a leather of improved fullness.

EXAMPLE 2

10 kg of a solution prepared from naphthalene by sulphonation followed by condensation with formaldehyde and having an osmotic pressure of 75 bar are adjusted to a pH of from 3 to 7 using aqueous ammonia and then subjected to cross-flow filtration at a transmembrane pressure of 35 bar and at a temperature of 25° C. This is done using a tubular membrane having a MWCO of 2,000 g/mol. Threefold difiltration (discontinuous) reduces the sulphate content from 6.9% to <0.2%. At the same time, the residual monomer content (1- and 2-naphthalenesulphonic acid), based on the overall amount of condensation product, falls from 25 to 13% by weight. The mean degree of condensation was less than or equal to 5. At the same time, the content of active substance experiences no further change. When employed for the retanning of leather, the preparation gives a product which is improved in hand and fullness.

EXAMPLE 3

100 kg of a suspension prepared by sulphonation of ditolyl ether followed by condensation with formaldehyde are adjusted to a pH of from 3 to 7 using sodium hydroxide solution and then dissolved by heating to 40° C. This solution is subjected to cross-flow filtration at a transmembrane pressure of 40 bar and at a temperature of 40° C. This is done using flat membranes in spiral wound modular form with a MWCO of 3,500 g/mol. Continuous difiltration reduces the sulphate content from 6.0 to 1.2%. In the course of subsequent concentration, the content of active substance is raised by 50%. At the same time, the sulphate content falls further to 0.6%. At the same time, the residual monomer content, based on the overall amount of condensation product, falls from 15 to 10% by weight. The mean degree of condensation is less than or equal to 5. The solution thus obtained is storage-stable at the high active-substance concentration and is suitable as an additive to liquid formulations without adversely affecting their storage stability. When used as dispersant, the action of the preparation is markedly improved relative to the initial product. The preparation can be employed in the formulation of pigment inks.

EXAMPLE 4

13 kg of a solution prepared from 18 parts of phenol and 31 parts of ditolyl ether by sulphonation followed by condensation with formaldehyde are adjusted to a pH of from 3 to 7 using sodium hydroxide solution and then subjected to cross-flow filtration at a transmembrane pressure of 40 bar and at a temperature of 55° C. This is done using flat membranes with a MWCO of 8,000 g/mol in a plate module. Threefold continuous difiltration reduces the sulphate content from 5.0% to <0.2%. In the course of subsequent concentration, the content of active substance is raised by 60%. At the same time, the residual monomer content (4,4'-dihydroxydiphenyl sulphone), based on the overall amount of condensation product, falls from 15 to 8% by weight. The condensation product has a mean degree of condensation of less than or equal to 5. The preparation obtained is also very storage-stable despite 50% or more of active substance and, when employed as a tanning agent, produces a leather having better properties than when the salt-containing initial product is employed.

EXAMPLE 5

15 kg of a solution prepared from equal proportions of naphthalene and phenol by sulphonation followed by condensation with formaldehyde are adjusted to a pH of from 3 to 7 using aqueous ammonia and then subjected to cross-flow filtration at a transmembrane pressure of 55 bar and at a temperature of 55° C. This is done using flat membranes with a MWCO of 2,500 g/mol in a membrane pocket module. Threefold continuous difiltration reduces the sulphate content from 4.5% to 0.3%. At the same time, the residual monomer content (noncondensed phenolsulphonic acids, naphthalenesulphonic acids and 4,4'-dihydroxydiphenyl sulphone), based on the overall amount of condensation product, falls from 43 to 28% by weight. When employed as a tanning agent, the preparation produces a leather having better properties than when the salt-containing initial product is employed.

EXAMPLE 6

15 kg of a solution prepared from equal proportions of naphthalene and phenol by sulphonation followed by condensation with formaldehyde are adjusted to a pH of from 3 to 7 using aqueous ammonia and then subjected to cross-flow filtration at a transmembrane pressure of 10 bar and at a temperature of 55° C. This is done using tubular membranes with a MWCO of 200,000 g/mol. The membrane process separated off constituents of relatively high degrees of condensation, with the result that the permeate consists exclusively of compounds having a mean degree of condensation of less than or equal to 3. When employed as a tanning agent, the permeate produces a leather having better properties than when the untreated initial product is employed. Subsequently the permeate was additionally desalted, giving a concentrated, storage-stable liquid formulation.

EXAMPLE 7

2 kg of a solution prepared from 18 parts of phenol and 31 parts of ditolyl ether by sulphonation followed by condensation with formaldehyde are adjusted to a pH of from 3 to 7 using sodium hydroxide solution and subjected to electrodialysis at a temperature of 40° C. After 55 h, the sulphate content had fallen from 5.0% to 1.0%. The condensation product has a mean degree of condensation of less than or equal to 5. Unlike the salt-containing initial product, the diluate—even at high concentrations of active substance—has good storage stability and, when employed as a tanning agent, produces a leather having improved properties.

EXAMPLE 8

50 kg of a solution prepared from equal proportions of naphthalene and phenol by sulphonation followed by condensation with formaldehyde were subjected to crossflow filtration directly after condensation, i.e. without addition of alkali, at 50° C. and 30 bar module inlet pressure. This was done using acid-resistant membranes made from cyclic polyureas, as are known, for example, from EP-A-652 044, in the form of a flat membrane in spiral wound form with a MWCO of about 2,000 g/mol. Single exchange of the entire amount for deionized water reduced the sulphuric acid content by about 85%, so that after the pH adjustment a formulation was obtained which contained about 85% less neutralization salt than a standard product preparable from the above initial product directly by addition of alkali. In the course of the membrane desalting, the residual monomer content, based on the overall amount of condensation product, fell from 29 to 22% by weight. When employed as a tanning agent, the same performance results were obtained, with only 90% of the amount, as with a product obtained directly from the initial product by addition of alkali.

USE EXAMPLES

Method of tanning leather

Chrome-tanned leather (wet blue) is treated in aqueous liquor first of all with about 3% of a preparation obtained in accordance with the invention, which has the property of a neutralization tanning agent, then with about 4% of a fat oil (1.5 h, 40° C.). After exchanging the liquor and washing with water, about 5% of a novel preparation, or a combination of two or more preparations obtained in accordance with the invention, which have the properties of exchange tanning agents, act, optionally together with a leather dye, for about 1 h at about 40 to 60° C. This is followed by an acid treatment and, after draining the liquor and washing the leather, by a treatment with greases and/or plasticizing stabilizers.

Method of dispersing organic pigments

A suspension of the organic pigment with a pigment content of about 20% is mixed with about 5% of a novel preparation and the suspension is subsequently ground twice in a bead mill. A storage-stable dispersion which can optionally also be spray-dried is obtained.

Method of dispersing/stabilizing leather dyes in the dying operation

In performing so-called retanning, which can likewise be carried out with preparations obtained in accordance with the invention, a solution at a temperature of 60° C. and having about 3% dye and 2% of a preparation obtained in accordance with the invention (Example 3) is added to the liquor, which is at 40° C. This mixture is allowed to act for about 60 minutes. After dilution, acidification, draining of the liquor and washing of the leather, the customary after-treatment measures are conducted.

Method of stabilizing anionic optical brightener formulations

About 0.2% of a solid preparation obtained in accordance with the invention is added to a previously desalted solution of the brightener, whose brightener content is about 27% and which additionally comprises about 20% of solubilizer, and the mixture is homogenized by stirring.

Method of liquefying concrete

To liquefy a concrete suspension, from 0.1 to 1.0% of the preparation obtained in accordance with the invention, preferably comprising a naphthalenesulphonic acid-formaldehyde condensate, is added.

[Test: from 1 to 5 ml of a 1% strength solution of the condensate are added to 10 g of zinc oxide. The mixture becomes readily fluid. Without the addition of the condensate, a highly viscous paste is produced.]

We claim:

1. A process for preparing a low-salt preparation of a condensation product having a mean degree of condensation of from 1 to 150 based on
   A) sulphonated aromatics,
   B) aldehydes, ketones, or both and optionally
   C) one or more compounds selected from the group consisting of non-sulphonated aromatics, urea and urea derivatives,
   wherein inorganic acid present after the condensation is separated off in whole or in part from the condensation product, in the form of the acid or in the form of its salts or as a mixture thereof after neutralization, until the inorganic salt content is less than 10% by weight, relative to the preparation by a membrane separation technique.

2. The process according to claim 1, wherein the membrane separation technique employed is ultrafiltration, diffusion dialysis or electrodialysis.

3. The process according to claim 2, wherein, in the membrane separation technique, an ultrafiltration membrane which has a molecular weight cutoff (MWCO) level of from 1,000 to 10,000 daltons, is employed.

4. The process according to claim 1, wherein the condensation products have been prepared from
   A) sulphonated aromatics,
   B) formaldehyde and optionally
   C) nonsulphonated aromatics.

5. A preparation comprising a condensation product based on
   A) sulphonated aromatics,
   B) aldehydes and/or ketones and optionally
   C) one or more compounds selected from the group consisting of nonsulphonated aromatics, urea and urea derivatives,
   the condensation product having a mean degree of condensation of less than or equal to 5 and the inorganic salt content of the preparation being less than 10% by weight, relative to the preparation.

6. A preparation comprising a condensation product having a mean degree of condensation of from 1 to 20 based on
   A) sulphonated aromatics,
   B) aldehydes, ketones or both and optionally
   C) one or more compounds selected from the group consisting of nonsulphonated aromatics, urea and urea derivatives,
   the residual monomer content being less than 30% by weight, based on the condensation product, and the inorganic salt content being less than 10% by weight, relative to the preparation.

7. The preparation according to claim 7 having a residual monomer content being less than 20% by weight based on the condensation product and the inorganic salt content being less than 5% by weight, relative to the preparation.

8. A preparation comprising a condensation product, obtainable by permeating an aqueous solution or suspension of a condensation product based on
   A) sulphonated aromatics,
   B) aldehydes and/or ketones and optionally
   C) one or more compounds selected from the group consisting of nonsulphonated aromatics, urea and urea derivatives
   through an ultrafiltration membrane which has a MWCO level of >80,000 daltons.

9. The preparation according to claim 8, wherein the aqueous solution or suspension of the condensation product is permeated through an ultrafiltration membrane which has a MWCO level of 200,000 to 500,000 daltons.

10. Preparations according to claim 5, wherein the condensation products have been prepared from
    A) sulphonated aromatics,
    B) formaldehyde and optionally
    C) nonsulphonated aromatics.

11. The process of claim 1 wherein the condensation product has a mean degree of condensation of from 1 to 20.

12. The process of claim 1 wherein the condensation product has a mean degree of condensation of from 1 to 5.

13. The preparation of claim 6 wherein the condensation product has a mean degree of condensation of from 1 to 10.

14. The preparation of claim 6 wherein the condensation product has a mean degree of condensation of from 1 to 5.

15. A process for dispersing a solid by adding a dispersant to an aqueous suspension of said solid, wherein a preparation of claim 7 is applied as dispersant.

16. A process for dispersing a solid by adding a dispersant to an aqueous suspension of said solid, wherein a preparation obtained by the process of claim 1 is applied as dispersant.

17. A process for liquefying a suspension by adding a liquefier to said suspension, wherein a preparation obtained by the process of claim 1 is applied as liquefier.

18. A process for retanning leather, wherein a tanned leather is neutralized, dyed, retanned or greased in the presence of a preparation of claim 6.

19. A process for retanning leather, wherein a tanned leather is neutralized, dyed, retanned or greased in the presence of a preparation obtained by the process of claim 1.

* * * * *

UNITED STATES PATENT AND TRADEMARK OFFICE
CERTIFICATE OF CORRECTION

PATENT NO. : 5,888,400
DATED : March 30, 1999
INVENTOR(S) : Tholema et al.

It is certified that error appears in the above-identified patent and that said Letters Patent is hereby corrected as shown below:

| | |
|---|---|
| Title Page, Other Publications, Line 2 | Delete "Ullmaann's" and substitute --Ullmann's-- |
| Col. 12, Line 30 | Delete "7" and substitute --6-- |

Signed and Sealed this

Twenty-eighth Day of December, 1999

Attest:

Q. TODD DICKINSON

Attesting Officer

Acting Commissioner of Patents and Trademarks